(12) United States Patent
Beeckman et al.

(10) Patent No.: US 8,343,335 B2
(45) Date of Patent: Jan. 1, 2013

(54) PRODUCTION OF SHAPED SILICA BODIES

(75) Inventors: Jean W. Beeckman, Columbia, MD (US); Theodore E. Datz, Easton, PA (US); Glenn R. Sweeten, Gibbstown, NJ (US); Jason Wu, Clinton, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 384 days.

(21) Appl. No.: 12/070,861

(22) Filed: Feb. 21, 2008

(65) Prior Publication Data

US 2009/0216056 A1 Aug. 27, 2009

(51) Int. Cl.
*C10G 11/00* (2006.01)
(52) U.S. Cl. ............ 208/113; 502/66; 502/64; 502/232; 502/240; 502/243
(58) Field of Classification Search .................... 502/66, 502/64, 232, 240, 243; 208/113
See application file for complete search history.

(56) References Cited

U.S. PATENT DOCUMENTS

| 4,052,334 | A | * | 10/1977 | Mockett | 502/439 |
| 4,369,131 | A | * | 1/1983 | Risch et al. | 502/243 |
| 4,582,815 | A | * | 4/1986 | Bowes | 502/243 |
| 4,822,762 | A | * | 4/1989 | Ellig et al. | 502/66 |
| 5,153,165 | A | * | 10/1992 | Lowery et al. | 502/243 |
| 5,185,306 | A | | 2/1993 | Cohn et al. | |
| 6,576,120 | B1 | | 6/2003 | Van Ballegoy et al. | |
| 6,709,570 | B1 | | 3/2004 | Van Crijnen-Beers et al. | |

FOREIGN PATENT DOCUMENTS

| EP | 0 167 324 A2 | | 1/1986 |
| EP | 0167324 B1 | * | 1/1990 |
| GB | 2 063 700 | | 6/1981 |
| WO | WO 2006/026067 A1 | | 3/2006 |

\* cited by examiner

*Primary Examiner* — Prem C Singh
*Assistant Examiner* — Michelle Stein
(74) *Attorney, Agent, or Firm* — Ann M. Mareschal; David M. Wiesberg

(57) ABSTRACT

In a method of forming a shaped body, a mixture is formed comprising a particulate silica-rich material, water and a potassium base or basic salt, wherein the total solids content of the mixture is from about 20 to about 90 weight percent. The mixture is extruded into extrudates and the extrudates are dried and heated to a temperature of from about 300° C. to about 800° C. to form the shaped body.

15 Claims, No Drawings

PRODUCTION OF SHAPED SILICA BODIES

FIELD

This invention relates to the production of shaped silica bodies and to the use of shaped bodies as catalysts in organic conversion reactions.

BACKGROUND

Many industrial processes employ catalysts comprising a catalytically active material supported on a shaped body or bound in a shaped body. Examples of such catalysts include supported metals, supported metal complexes, supported organometallics, bound zeolites and bound zeolite-type materials. The shaped bodies used in such catalysts are typically made of refractory inorganic oxides by forming a mixture of one or several sources of the inorganic oxide in a suitable vehicle, such as water and/or an organic solvent. The mixture is then formed into various shapes, generally by extrusion, and subsequently dried and calcined to produce the final shaped body.

In order to be used as catalyst carriers, these bodies must have appropriate surface properties, sizes, shapes and porosities to carry the desired amounts of active materials. The shaped bodies must also be strong enough to enable catalyst handling, especially during reactor loading and unloading, and to sustain the conditions experienced during the intended catalytic use. They must also have appropriate porosities and shapes to avoid high pressure drops across the reactor and allow the desired catalytic reactions to take place.

The choice of catalyst carrier will depend on various factors, such as, for example, the intended catalytic use, the type of catalytic material used, the required catalyst strength and the required diffusivity across catalyst particles. The most commonly used carrier materials have included alumina and mixtures of the same with clays for the reason that these materials are very easy to extrude and result in the production of an extrudate having desirable physical strength as well as controllable diffusion properties.

For certain catalytic processes, such as the conversion of methanol and other oxygenates to olefins, it is desirable to use silica as the catalyst carrier. However, forming silica bound catalysts by extrusion has in the past proved difficult since processing silica-rich mixtures in conventional extruding equipment tends to give products with poor mechanical strength. This is particularly problematic in the case of crystalline silicate catalysts, such as zeolitic catalysts, where the catalytic material itself is silica-rich (that is contains more than 50 wt % silica).

One solution to the problem of producing silica extrudates with improved strength is proposed in U.S. Pat. No. 4,582,815. This patent discloses a method for extruding silica-rich solids which comprises mixing the silica-rich solids with water and an alkali metal base or basic salt followed by mulling and extruding wherein the amount of water added is sufficient to have a total solids content of from 25 to 75 weight percent, the alkali metal compound being added in an amount of from 0.25 to 10 weight percent on a dry basis based on the total solids calculated as sodium hydroxide equivalent, and drying and calcining the extrudates.

The extrusion method described in U.S. Pat. No. 4,582,815 has proved very effective in producing silica-bound catalysts with crush strength approaching that of extrudates made from alumina. However, when practiced on a commercial scale, it is found that the extrusion is accompanied by significant loss of solids due to the phenomenon known as "feathering". This means that the extrudate, instead of having a smooth outer surface, exhibits microscopic cracks in its surface where small flakes or "feathers" of the extrudate have separated from the surface. This not only causes loss of valuable catalyst material but also tends to impair the physical strength of the extrudate.

It has now been found that the problem of "feathering" during extrusion of silica rich mixtures can be reduced or avoided by employing potassium hydroxide instead of sodium hydroxide in the process of U.S. Pat. No. 4,582,815. Not only is the loss of solids as fines during the extrusion process reduced by the use of a potassium-derived alkali metal base or basic salt, but also the crush strength of the final calcined product is improved.

U.S. Pat. Nos. 6,576,120 and 6,709,570 disclose a method for preparing catalysts comprising ZSM-5 and silica which comprises: (a) preparing an extrudable mass by first mixing ZSM-5, an amorphous precipitated silica and an acid colloidal silica into a first homogeneous mixture having a pH below 7 and subsequently adding ammonia to the first homogeneous mixture such that the pH of the resulting second mixture has a value of above 8, (b) extruding the extrudable mass resulting from step (a), (c) drying the extrudate resulting from step (b); and, (d) calcining the dried extrudate resulting from step (c). However, not only do these patents fail to address the problem of "feathering", they require the use of an expensive acid colloidal silica and the provision of a scrubber or other gas treatment device to remove the ammonia vapors that are necessarily released in the drying and calcining steps.

International Publication Number WO 2006/026067-A1 describes a method for the manufacture of a structured body, which process comprises (a) preparing a batch composition free of organic solvent comprising (i) at least one particulate inorganic material, (ii) at least one particulate silicone resin of average particle size 700 microns or less, and (iii) water, and (b) forming the batch composition into a structured body. While this method provides shaped bodies with excellent properties, it requires the use of silicone resins that can be expensive if used on a very large scale.

SUMMARY

In one aspect, the invention resides in a method of forming a shaped body comprising forming a mixture comprising a particulate silica-rich material, water and a potassium base or basic salt, wherein the total solids content of the mixture is from about 20 to about 90 weight percent, extruding the mixture into an extrudate, drying the extrudate, and heating the extrudate to a temperature of from about 300° C. to about 800° C.

Conveniently, the potassium base or basic salt is potassium hydroxide. Typically, potassium base or basic salt is added to the mixture in an amount of from about 0.01 to about 15 weight percent, such as from about 1 to about 5 weight percent, on a dry basis, calculated as potassium hydroxide equivalent, based on the total solids content of the mixture.

Also, conveniently, the total solids content of the mixture is from about 35 to about 80 weight percent.

In one embodiment, the particulate silica-rich material comprises amorphous silica. In a further embodiment, the particulate silica-rich material comprises a crystalline silicate, metallosilicate or silicoaluminophosphate. In yet a further embodiment, the particulate silica-rich material comprises a mixture of amorphous silica and a crystalline silicate, metallosilicate, and/or silicoaluminophosphate.

Conveniently, the method further comprises mulling the mixture for about 1 minute to about 2 hours prior to said extruding.

DETAILED DESCRIPTION

The present invention is directed to a method of forming a shaped silica body by extruding a mixture comprising a particulate silica-rich material, water and a potassium base or basic salt, particularly potassium hydroxide, wherein the total solids content of the mixture is from about 20 to about 90 weight percent. The resulting extrudate is then dried and heated to a temperature of from about 300° C. to about 800° C. to produce the shaped body. In particular, it is found that by using a potassium base or basic salt, rather than a sodium hydroxide, as the peptizing agent in producing the extrudable mixture, the solids loss during the extrusion step is less than 5 weight % based on the total solids content of the initial mixture. In contrast, when sodium hydroxide is employed as the peptizing agent solids losses are typically about 10%, and can be as high as 15 to 20%, by weight based on the total solids content of the initial mixture.

The silica-rich material used herein can be any particulate material containing at least 50 wt %, typically at least 75 wt %, and particularly at least 85 wt %, silica present either as an amorphous silica, or as a crystalline silicate, metallosilicate and/or silicoaluminophosphate, or as a mixture of amorphous silica and a crystalline silicate, metallosilicate, and/or silicoaluminophosphate.

Suitable forms of amorphous silica include silica powders, such as Ultrasil VN3SP (commercially available from Degussa) since this material is very cheap and easily available in large commercial scale quantities. Other non-limiting examples of a suitable solid silica source are HiSil 233 EP (available from PPG Industries) and Tokusil (available from Tokuyama Asia Pacific), In addition, suitable amorphous silica sources include silica sols, which are stable colloidal dispersions of amorphous silica particles in an aqueous or organic liquid medium, preferably water. Non-limiting examples of commercially available silica sols include those sold under the tradenames Nyacol (available from Nyacol Nano Technologies, Inc. or PQ Corp.), Nalco (available from Nalco Chemical Company), Ultra-Sol (available from RESI Inc), Ludox (available from W.R. Grace Davison), NexSil (available from NNTI). Many silica sols are prepared from sodium silicate and inevitably contain sodium. It is, however, found that the presence of sodium ions can cause sintering of the silica body at high temperature and/or affect catalytic performance. Therefore, if silica sols containing sodium are used, a step of ion exchange may be required in order to reduce or remove sodium. To avoid carrying out ion exchange steps, it is convenient to use silica sols that contain very little or, ideally, no detectable traces of sodium and have a pH value of less than 7. Most preferably, the silica sol used in the process is slightly acidic. Non limiting examples of silica sols that contain no detectable traces of sodium include Nyacol 2034DI, Nalco 1034A, Ultra-Sol 7H or NexSil 20A.

Suitable forms of crystalline silica include microporous and mesoporous molecular sieves containing $SiO_4$ tetrahedra, such as crystalline silicates, metallosilicates (especially aluminosilicates) and silicoaluminophosphates. Non-limiting examples of such zeolitic materials include ZSM-5, ZSM-11, ZSM-12, ZSM-22, ZSM-23, ZSM-48, ZSM-57, MCM-22, MCM-41, M-41S, MCM-48, chabazite, faujasite, zeolite Y, zeolite beta, ferrierite, SAPO-5, SAPO-11, SAPO-18, SAPO-34, SAPO-56, ITQ-1, ITQ-2, ITQ-3, ITQ-13, ITQ-21, ITQ-22, ITQ-24, metal-containing forms thereof, intergrown crystalline forms thereof and mixtures thereof. Non-limiting examples of such materials include aluminosilicates or germanoaluminosilicates having a silica to alumina molar ratio of at least 10. In one embodiment, the crystalline silica is ZSM-5.

It is also possible to employ the present process to produce a shaped body from a mixture of amorphous silica and a crystalline molecular sieve, in which case the molecular sieve may contain $SiO_4$ tetrahedra, that is, the crystalline molecular sieve may be a silicate, metallosilicate and/or silicoaluminophosphate, or may be a non-silicon containing molecular sieve, such as an aluminophosphate and/or a metalloaluminophosphate, provided the silica and/or silicate content of the overall mixture exceeds 50 wt %.

In order to form the shaped body, the particulate silica-rich material is initially mixed with water and a potassium base, such as potassium hydroxide or a potassium basic salt, such as potassium carbonate, borate, phosphate, or silicate. The relative amounts of the silica-rich material, water and potassium compound are selected so that the resultant mixture has a total solids content of from about 20 to about 90 weight percent, typically from about 35 to about 80 weight percent, such as from about 35 to about 65 weight percent, and contains from about 0.01 to about 15 weight percent, such as from about 1 to about 5 weight percent, of the potassium compound on a dry basis, calculated as potassium hydroxide equivalent, based on the total solids content of the mixture. The amount of silica-rich material present in the mixture can vary within wide limits, typically from about 5 to about 90 weight percent, such as from about 20 to about 95 weight percent of the overall mixture.

In addition to the silica-rich material, water and potassium compound, at least one polymeric organic extrusion aid may be incorporated in the mixture. Non limiting examples of suitable polymeric organic extrusion aids include polyvinyl alcohols, cellulose, and cellulose ethers, such as methylcellulose and hydroxypropyl methyl cellulose polymers. If present, the polymeric extrusion aid is typically used in amounts of from about 0.1 to about 5 parts by weight, such as from about 0.5 to about 3 parts by weight, per 100 parts by weight of the silica-rich material in the mixture.

The mixture is typically prepared by combining the ingredients together in a mixer, such as, for example, an Eirich mixer or a wheel mixer. The mixture components may be added in different orders to the mixer. As a non limiting example, the solid components can be placed first in the mixer, followed by the liquid components. The components are typically mixed at room temperature and, if necessary, milling can also be applied to break down solid particles to a suitable size for mixture homogeneity, cohesion and viscosity. Generally, the mixture is mixed for about 1 minute to about 2 hours before being formed into the required shaped body.

Particle shaping is generally performed by extrusion. Extrusion apparatuses suitable for making rod-, cylindrical- or prism-shaped particles typically comprise a hopper for introduction of the mixture being shaped, a de-airing chamber, and either a screw-type or plunger-type transport barrel in which pressure is generated for passage of the mixture through a die of the desired geometry. The mixture is extruded onto a carrier belt and passed through driers to relax the strain remaining after extrusion. The driers remove most of the water from the extruded product, but typically do not remove any organic material that may be present in the extrudates. Drying is usually performed at a temperature of less than 200° C., such as between 100° C. and 150° C., typically of from 120° C. to 140° C. for a period of at least 10 minutes, such as from 10 minutes to several hours. The strands obtained after drying are broken up in smaller pieces to form cylinders or prisms. The cylinders or prisms are then sieved and broken up further to the required size range.

After shaping and drying at a temperature of less than 200° C., the shaped particles are usually referred to as "green" particles or green catalyst. The green particles still contain any polymeric extrusion aid that may have been used and typically have crush strengths that are too low for use in catalytic processes. Heat treatments are thus necessary to harden the particles, and remove any organic material that may be present in the catalyst and that could interfere during use of the shaped bodies. In the process of the invention, such heat treatment is performed by calcination, i.e. by heating at temperatures ranging from about 300° C. to about 800° C., for example from about 500° C. to about 750° C. If organic materials are present in the green shaped body, it is preferred that calcination take place in the presence of at least 2 vol. % air, preferably at least 5 vol. % air. In addition, it may be desirable to perform the calcination in the presence of steam, such as a mixture of steam and air, in order to obtain shaped bodies having a desired pore size range. Suitable calcination atmospheres contain 10-20 vol. % steam and 90-80 vol. % air; for example 2-10 vol. % air and 98-90 vol. % steam. By varying the calcination temperature and composition of the calcination atmosphere, shaped bodies with different pore sizes can be obtained.

Calcination can be conducted for variable amounts of time, depending on the calcination temperature and the composition of the calcination atmosphere. The duration should be sufficient to allow removal of any organic material present in the particles, and should also be sufficient to harden the particles to the desired level. However, calcination should not be carried out too long to avoid shaped body degradation. Typically, the desired results are achieved by applying the calcination conditions for a time of from about 10 to about 120 minutes, such as from about 15 to about 60 minutes.

The shaped body remaining after the calcination step typically has a crush strength of at least 536 g/mm (30 lb/inch), conveniently at least 715 g/mm (40 lb/inch), when determined by the strain beam method with a 3.175 mm (⅛ inch) Anvil configuration.

The shaped silica body produced by the present process is particularly suitable as a catalyst component and as a carrier for a supported catalyst. For example, when the silica-rich material comprises a mixture of amorphous silica and a zeolite or zeolite-type material, the process can be used to produce a shaped body comprising a silica-bound zeolite catalyst. In another embodiment, the shaped body is formed into a catalyst by depositing on the body, for example by impregnation, one or several metal-containing active materials, such as metals or compounds of metals selected from Group IVb, VIa and Group VIII of the Periodic Table of Elements. In a specific embodiment, the catalyst comprises a silica shaped body on which cobalt oxide and molybdenum oxide have been deposited. In yet another embodiment, the shaped body is employed as a catalyst support which comprises a zeolite or zeolite-type material bound with silica and which supports one or several metal-containing active metals.

The shaped bodies made by the present method are useful components of catalysts for use in a wide variety of catalytic processes, especially those that require rapid diffusion of reagents and products throughout the catalyst. Non-limiting examples of such catalytic processes include reactions using hydrogen, such as hydrogenation, desulfurization, hydrofining, hydrofinishing or hydrocracking, polymerization reactions, such as supported Ziegler-Natta or metallocene polymerization reactions, catalytic cracking, catalytic dewaxing, olefin oligomerization, olefin isomerization, alkylation, for example aromatic alkylation, reformate alkylation, phenol alkylation, the conversion of light olefins to gasoline, distillate and lube range hydrocarbons, the conversion of oxygenates to hydrocarbons.

The invention will now be more particularly described with reference to the following non-limiting Examples.

In the Examples, BET surface area was determined by nitrogen adsorption, using a Micromeritics Tristar V6.05 instrument. Pore volume ($N_2$ PV) and median pore diameter ($N_2$ PD) were also determined from the nitrogen adsorption measurements, according to the BET method.

Pore volume (PV), median pore diameter (PD) and total pore area were also determined by mercury intrusion porosimetry, according to the ASTM D 4284-03 method, assuming a contact angle of 130° for mercury on silica, using a Micrometitics AutoPore IV 9500 instrument.

The alumina content, sodium content and potassium content were determined by inductively coupled plasma (ICP) emission spectroscopy, using an IRIS instrument manufactured by Thermo Electron Corporation.

Crush strength (Crush) was determined by averaging the crush strength of 100 or more particles, determined with a Vankel VK200 Tablet Hardness Tester, using a strain beam method with a 3.175 mm (⅛ inch) Anvil configuration. The principle of the method is that a force is applied by the beam to the particle and the crush strength is the amount of force applied by the beam that will cause particle fracture. The instrument reports crush strength as lb/inches. A crush strength of 1 lb/inch can also be expressed as a crush strength of 17.87 g/mm.

Ultrasil VN3SP is a precipitated silica available from Degussa having a silica content of 98 wt %, a sodium content of about 0.4 wt %, an alumina content of about 0.1 wt % and a BET surface area of 155-195 m$^2$/g. Ludox (available from W.R. Grace Davison) is an aqueous colloidal silica sol having a silica content of 40 wt % and a pH of at least 7. Avicel is a microcrystalline cellulose extrusion aid supplied by FMC.

EXAMPLE 1

80 parts by weight of ZSM-5 (silica to alumina molar ratio of about 50 to 1), 10 parts by weight of Ultrasil VN3SP solids, 10 parts by weight of Ludox solids, and 48 parts by weight of water were mixed with 250 parts by weight of a 12 wt % aqueous potassium hydroxide solution so as to produce a mixture with total solids content of 58 wt % and a KOH content of 3 wt % on a dry basis based on the total solids content. Mixing was conducted in an Eirich mixer, with the pan rotation and blade rotation both being on their respective high settings for the equipment. Mixing was continued until an extrudable mixture was obtained.

The resultant mixture was extruded to produce a cylindrical extrudate having a diameter of 1/16 inch (1.6 mm). The extrudate was then dried at 300° F. (150° C.) for 60 minutes, whereafter the dried material was shaken vigorously for about 1 minute to remove loose particulate material, the "feathers". The loose particulate material was sieved through a 14 Mesh sieve and was collected and weighed. After removal of the "feathers", the dried extrudate was calcined at 538° C. for 60 minutes to produce the final shaped body. When the body had cooled, its crush strength was measured. The results are summarized in Table 1.

EXAMPLE 2

Example 1 was repeated but with the potassium hydroxide solution being replaced with 250 parts by weight of a 12 wt % aqueous sodium hydroxide solution so that the NaOH was present in the mixture in an amount of 3 wt % on a dry basis based on the total solids content of the mixture. Again the results are summarized in Table 1.

TABLE 1

|  | Example | |
|---|---|---|
|  | 1 | 2 |
| Caustic | 3% KOH | 3% NaOH |
| Total Weight (gms) | 84.65 | 88.27 |
| 14 Mesh + (gms) | 83.60 | 73.12 |
| 14 Mesh − (gms) | 1.12 | 15.19 |
| Wt % Fines | 1.3 | 17.2 |
| Calcined Crush | 84 lb/in | 64 lb/in |

It will be seen from Table that the process of Example 1 using potassium hydroxide as the peptizing agent not only produced only 1.3 wt % fines, as compared with the 17.2 wt % fines obtained in Example 2 with sodium hydroxide as the peptizing agent, but also gave a silica body with higher crush strength that that of Example 1 (84 lb/in versus 64 lb/in).

EXAMPLE 3

Ultrasil VN3SP silica, Avicel (a microcrystalline cellulose extrusion aid), a 12 wt % aqueous potassium hydroxide solution and water were combined to produce an aqueous mixture having a solids content of 47 wt % with the solids being composed of 100 parts Ultrasil VN3SP silica solids, 20 parts Avicel and 2 parts KOH on a dry basis. Mixing was conducted in an Eirich mixer, with the pan rotation and blade rotation both being on their respective high settings for the equipment. Mixing was continued until an extrudable mixture was obtained.

The resultant mixture was extruded to produce a quadru-lobe extrudate having a diameter of 1/20 inch (1.3 mm). The extrudate was then dried at 250° F. (121° C.) for 60 minutes and calcined at 540° C. for 60 minutes to produce the final shaped body. When the body had cooled, its crush strength was measured and the fines loss was measured and found to be without feathers.

The product was then refluxed in a hot solution using 10 times the amount of DI water as catalyst and at a pH<10 for 120 minutes and this procedure was repeated until the pH no longer changed. Again the crush strength was measured. The product was then subjected to ammonium exchange at 60° C. with a 1N aqueous ammonium nitrate solution and again the crush strength was measured. The results of the crush strength measurements and the other properties of the shaped body are summarized in Table 2.

EXAMPLE 4

The process of Example 3 was repeated but with the initial aqueous mixture having a solids content of 45 wt % with the solids being composed of 100 parts Ultrasil VN3SP silica solids, 20 parts Avicel and 4 parts KOH on a dry basis. The properties of the resultant shaped body are summarized in Table 2.

EXAMPLE 5

The process of Example 4 was again repeated but with the initial aqueous mixture having a solids content of 42 wt %. The properties of the resultant shaped body are summarized in Table 2.

EXAMPLE 6

Ultrasil VN3SP silica, a 12 wt % aqueous potassium hydroxide solution and water were combined to produce an aqueous mixture having a solids content of 47 wt % with the solids being composed of 100 parts of Ultrasil VN3SP silica solids and 4 parts KOH on a dry basis. The mixture was mixed in an Eirich mixer, with the pan rotation and blade rotation both being on their respective high settings for the equipment. Mixing was continued until an extrudable mixture was obtained.

The resultant mixture was extruded to produce a quadru-lobe extrudate having a diameter of 1/20 inch (1.3 mm). The extrudate was then dried at 250° F. (121° C.) for 60 minutes and calcined at 538° C. for 60 minutes to produce the final shaped body. When the body had cooled, its crush strength was measured at 80 lbs/inch.

The product was then refluxed in a hot solution using 10 times the amount of DI water as catalyst and at a pH<10 for 120 minutes and this procedure was repeated until the pH no longer changed. Again the crush strength was measured. The product was then subjected to ammonium exchange at 60° C. with a 1N aqueous ammonium nitrate solution and again the crush strength was measured. The results of the crush strength measurements and the other properties of the shaped body are summarized in Table 2.

EXAMPLE 7

The process of Example 6 was repeated but with the initial aqueous mixture having a solids content of 45 wt %. The properties of the resultant shaped body are summarized in Table 2.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

TABLE 2

| Example | % OSAT[1] | $N_2$ BET | $N_2$ PV | $N_2$ PD (Å) | $H_2O$ $PV^2$ | PV D4384 | Pore Size by Hg (Å) | Total Hg pore area | $Al_2O_3$ wt % | Na wt % | K wt % | Crush lb/in |
|---|---|---|---|---|---|---|---|---|---|---|---|---|
| Ex. 3 calcined | 13.1 | 145 | 0.58 | 176 | 1.18 |  | 210 | 193 | 0.10 | 0.49 | 1.31 | 55.2 |
| Ex. 3 calcined, pH 10 reflux | 11.7 | 172 | 0.57 | 135 | 1.32 |  | 233 | 171 |  | 0.25 | 0.86 | 73.6 |
| Ex. 3 calcined, pH 10 reflux, and $NH_4$— exchanged | 8.4 | 126 | 0.86 | 223 | 1.23 |  |  |  | 0.09 | 0.18 | 0.57 | 62.4 |
| Ex. 4 calcined, pH 10 reflux |  | 108 | 0.72 | 221 | 0.97 | 0.848 | 215 | 161 | 0.07 | 0.23 | 1.45 | 92.8 |

TABLE 2-continued

| Example | % OSAT[1] | N₂ BET | N₂ PV | N₂ PD (Å) | H₂O PV[2] | PV D4384 | Pore Size by Hg (Å) | Total Hg pore area | Al₂O₃ wt % | Na wt % | K wt % | Crush lb/in |
|---|---|---|---|---|---|---|---|---|---|---|---|---|
| Ex. 4 calcined, NH₄—exchanged | 11.5 | 127 | 0.68 | 186 | 0.92 | | | | 0.08 | 0.28 | 1.22 | 71.2 |
| Ex. 5 calcined, pH 10 reflux | 12 | 113 | 0.69 | 220 | 0.95 | 0.881 | 215 | 167 | 0.07 | 0.22 | 1.48 | 87.2 |
| Ex. 5 calcined, NH₄—exchanged | 10.7 | 127 | 0.80 | 200 | 0.95 | | | | 0.07 | 0.28 | 1.21 | 70.4 |
| Ex. 6 calcined, pH 10 reflux | | 121 | 0.59 | 189 | 0.89 | 0.732 | 199 | 154 | 0.07 | 0.19 | 1.41 | 100 |
| Ex. 6 calcined, NH₄—exchanged | | 132 | 0.78 | 188 | 0.83 | | | | 0.09 | 0.28 | 1.25 | 92 |
| Ex. 7 calcined, pH 10 reflux | | 123 | 0.78 | 206 | 0.83 | 0.734 | 195 | 157 | 0.08 | 0.19 | 1.41 | 120 |

[1]% OSAT refers to percent olefin saturation and can be measured via a Bromine index comparison of feed and product or by GC analysis.
[2]H₂O PV refers to water pore volume and is measured by contacting say 1 gm of catalyst with water and letting it equilibrate. The wet catalyst is removed and blotted (but not dried) and weighed again. The increase in weight expressed as cc H₂O/(gm catalyst) is reported as the water pore volume.

What is claimed is:

1. A method of forming a shaped body having reduced feathering tendency, comprising forming a mixture comprising a particulate silica-rich material, water, and a base or basic salt consisting essentially of potassium hydroxide, wherein the total solids content of the mixture is from about 20 to about 90 weight percent, extruding the mixture into an extrudate, drying the extrudate, and heating the extrudate, without neutralizing the base, to a temperature of from about 300° C. to about 800° C.

2. The method of claim 1, wherein the particulate silica-rich material comprises amorphous silica.

3. The method of claim 1, wherein the particulate silica-rich material comprises a crystalline silicate.

4. The method of claim 3, wherein the crystalline silicate comprises ZSM-5.

5. The method of claim 1, wherein the particulate silica-rich material comprises amorphous silica and a crystalline silicate.

6. The method of claim 5, wherein the crystalline silicate comprises ZSM-5.

7. The method of claim 1, wherein the total solids content of the mixture is from about 35 to about 65 weight percent.

8. The method of claim 1, wherein potassium hydroxide is added to the mixture in an amount of from about 0.01 to about 15 weight percent on a dry basis, based on the total solids content of the mixture.

9. The method of claim 1, wherein potassium hydroxide is added to the mixture in an amount of from about 1 to about 5 weight percent on a dry basis, based on the total solids content of the mixture.

10. The method of claim 1 and further con ng mixing the mixture for about 1 minute to about 2 hours prior to said extruding.

11. The method of claim 1, wherein the solids loss during said extruding is less than 5 weight % based on the total solids content of the initial mixture.

12. The method of claim 1, wherein said drying is performed at a temperature of less than 200° C.

13. The method of claim 1, wherein the extrudate is heated to a temperature of from about 500° C. to about 750° C.

14. A catalyst comprising a shaped body produced by the method of claim 11.

15. A process for converting a hydrocarbon feedstock, wherein the hydrocarbon feedstock is contacted with the catalyst of claim 14 under conversion conditions, to form a converted product.

* * * * *